(12) United States Patent
Jerphagnon et al.

(10) Patent No.: US 6,778,739 B1
(45) Date of Patent: Aug. 17, 2004

(54) WAVELENGTH SELECTIVE OPTICAL SWITCH WITH ALIGNED INPUT AND OUTPUT SUBSTRATES

(75) Inventors: Olivier L. Jerphagnon, Santa Barbara, CA (US); Daniel J. Blumenthal, Santa Barbara, CA (US); Chandrasekhar Pusarla, Goleta, CA (US)

(73) Assignee: Calient Networks, San Jose, CA (US)

( * ) Notice: Subject to any disclaimer, the term of this patent is extended or adjusted under 35 U.S.C. 154(b) by 138 days.

(21) Appl. No.: 09/899,899

(22) Filed: Jul. 5, 2001

(51) Int. Cl.[7] .............................. G02B 6/26; G02B 6/42
(52) U.S. Cl. ............................ 385/52; 385/17; 385/18; 398/48
(58) Field of Search ............................ 385/16, 17, 18, 385/24, 37, 52; 398/45, 48–50, 56, 79

(56) References Cited

U.S. PATENT DOCUMENTS

| | | | |
|---|---|---|---|
| 5,002,350 A | 3/1991 | Dragone | 385/24 |
| 5,136,671 A | 8/1992 | Dragone | 385/46 |
| 5,671,304 A * | 9/1997 | Duguay | 385/17 |
| 5,904,042 A | 5/1999 | Rohrbaugh | 60/298 |
| 5,960,133 A | 9/1999 | Tomlinson | 385/18 |
| 6,097,859 A | 8/2000 | Solgaard et al. | 385/17 |
| 6,256,125 B1 * | 7/2001 | Uehara | 398/79 |
| 6,504,965 B2 * | 1/2003 | Paniccia et al. | 385/16 |

OTHER PUBLICATIONS

P. Meshkinfam[1], P. Fournier[1], M.A. Fardad[2], M.P. Andrews[2], and S.I. Najafi[1] "Integrated optics Er–Yb amplifier with potassium ion–exchanged glass waveguides", [1]Photonics Research Group, Ecole Polytechnique, Montreal, Quebec, H3C 3A7, Canada, [2]Chemistry Department, McGill University, Montreal, Quebec, H3A 2K6, Canada, p. 1–6.

* cited by examiner

Primary Examiner—Mark A. Robinson
Assistant Examiner—Alessandro Amari
(74) Attorney, Agent, or Firm—Beyer Weaver & Thomas, LLP

(57) ABSTRACT

A scalable optical switch that uses substrates to multiplex and demultiplex input and output optical signals for optical networks. The switch includes a plurality of input fibers each configured to carry a plurality of lambda signals, a first stack of substrates, each of the substrates coupled to one of the input fibers and configured to demultiplex the lambda signals received on the input fiber by wavelength respectively, a plurality of output fibers, and a switching matrix configured to switch the demultiplexed lambda signals from the first stack of substrates to the plurality of output fibers. In one embodiment, the switch further includes a second stack of substrates coupled between the switching matrix and the output fibers. Each of the substrates of the second stack is configured to multiplex the switched lambda signals onto one of the output fibers respectively. In an alternative embodiment, the second stack of substrates is replaced with a fixed mirror so that the input fibers can also be used as output fibers. In other embodiments of the invention, alignment plates are used to align the substrates of the first stack and/or the second stack respectively. In yet other embodiments, the optical switch of the present invention is scalable to form a large photonic switching system where individual switches are each used for specific bands or sub-bands of amplification.

61 Claims, 4 Drawing Sheets

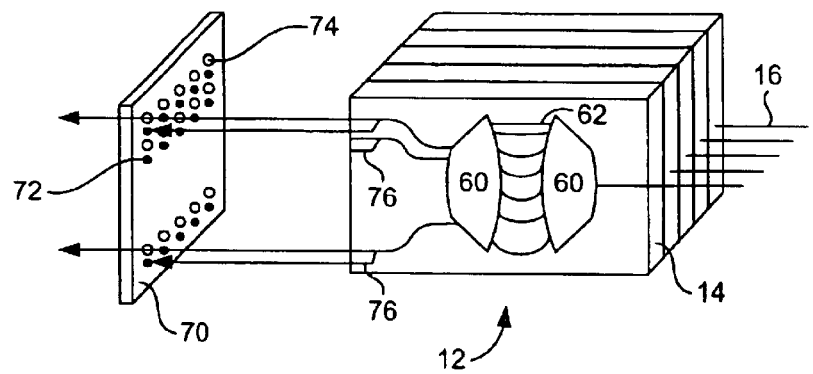
FIG. 4
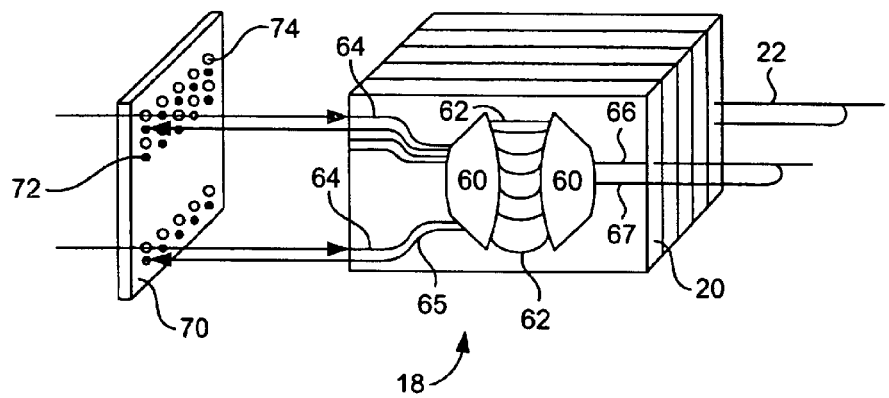
FIG. 5
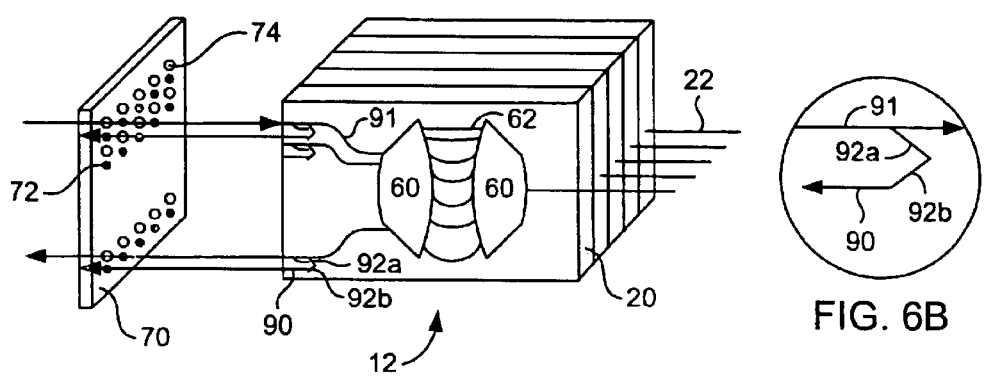
FIG. 6
FIG. 6B

WAVELENGTH SELECTIVE OPTICAL SWITCH WITH ALIGNED INPUT AND OUTPUT SUBSTRATES

FIELD OF THE INVENTION

The present invention relates generally to communication networks, and more specifically, to a scalable optical switch that uses substrates to demultiplex and multiplex input and output signals for optical networks.

BACKGROUND OF THE INVENTION

Wave Division Multiplexing (WDM) is an optical networking technology that offers enormous bandwidth capabilities. With WDM, data is transmitted through optical fibers using wavelengths or lambdas. By transmitting lambda signals each of a different wavelength channel, multiple data streams can be simultaneously transmitted through a single fiber. Bandwidth is further increased by bundling multiple fibers together. The potential bandwidth for WDM systems in the future is virtually limitless as advances in the number of wavelength channels per fiber and the number of fibers that can be bundled together are made.

Wavelength routing is one challenge currently confronting designers developing WDM networking systems. Ideally designers would like to route optical signals of different wavelengths entirely in the optical domain. This would eliminate the need to convert optical signals into electrical signals and vice-versa. Wavelength routing involves the ability to switch optical signals from one fiber to another. Currently photonic cross-connect systems or re-configurable optical switches that perform this function are known. One known technology uses two-dimensional arrays of Micro Electro-Mechanical System (MEMS) mirrors in a three-dimensional configuration to switch optical signals from any input fiber to any output fiber. Since photonic cross-connects only perform optical switching, demultiplexers are needed to separate individual wavelengths from the fibers prior to switching and multiplexers are needed to place the switched wavelengths signals onto output fibers. For M fibers with N channels an M×N-by-M×N switch with $(NM)^2$ possible connections is needed. Because one wavelength entering the switching matrix is only to be switched to an output port of same wavelength, only $N \times M^2$ connections are actually needed. The complexity can be reduced to the minimum number of connections by using N M-by-M switches. However it still requires two N×M fiber interconnections between the de/multiplexers and the switching matrix. To eliminate the fiber interconnections, which is a bottleneck for large number of fibers and channels, and to potentially increase the performance of the system, the integration of the de/multiplexing function with the switching matrix is needed.

One known way of integrating the de/multiplexing capability is to use dispersive elements such as reflection gratings with MEMS mirrors. See for example U.S. Pat. Nos. 5,960, 133 and 6,097,859, both incorporated herein for all purposes. With these types of devices, a first grating is typically used to separate (demultiplex) the channels on the input fibers into individual wavelength signals or lambdas. The MEMS array is then used to switch the wavelength (lambda) signals to a second grating, which is configured in the opposite direction of the first grating. The second grating multiplexes the wavelength signals onto the output fibers.

Gratings used to disperse optical beams in free-space into different wavelength components are problematic for several reasons. They are difficult to align with other optical components in the switch. They also increase the optical path between the inputs and outputs of the switch, thereby increasing signal attenuation, which reduces the performance of the switch. Finally, they are polarization dependent, meaning the amount of signal attenuation through the gratings is highly dependent on the polarization of the incoming signals. Accordingly the use of gratings significantly complicates the design of current optical switches, reduces performance, and limits the scalability of these devices.

A scalable optical switch that uses stackable substrates to demultiplex and multiplex input and output signals for optical networks is therefore needed.

SUMMARY OF THE INVENTION

The present invention relates to a scalable optical switch that uses substrates to demultiplex and multiplex input and output signals for optical networks. The switch includes a plurality of input fibers each configured to carry a plurality of lambda signals, a first stack of substrates, each of the substrates coupled to one of the input fibers and configured to demultiplex the lambda signals received on the input fiber by wavelength respectively, a plurality of output fibers, and a switching matrix configured to switch the demultiplexed lambda signals from the first stack of substrates to the plurality of output fibers. In one embodiment, the switch further includes a second stack of substrates coupled between the switching matrix and the output fibers. Each of the substrates of the second stack is configured to multiplex the switched lambda signals onto one of the output fibers respectively. In an alternative embodiment, the second stack of substrates is replaced with a fixed mirror so that the input fibers can also be used as output fibers. In other embodiments of the invention, alignment plates are used to align the substrates of the first stack and/or the second stack respectively. In yet other embodiments, the optical switch of the present invention is scalable to form a large photonic switching system where individual switches are each used for specific bands or sub-bands of amplification.

BRIEF DESCRIPTION OF THE DRAWINGS

The invention, together with further advantages thereof, may best be understood by reference to the following description taken in conjunction with the accompanying drawings in which:

FIG. 4 is a diagram of an alignment plate for aligning input substrates of the optical switch of the present invention.

FIG. 5 is a diagram of an alignment plate for aligning output substrates of the optical switch of the present invention.

FIG. 6 is a diagram of an alignment plate for aligning output substrates of the optical switch according to another embodiment of the present invention.

FIG. 6B is an exploded view of a portion of the alignment plate of FIG. 7 according to one embodiment of the present invention.

DETAILED DESCRIPTION OF THE INVENTION

Figure 1:
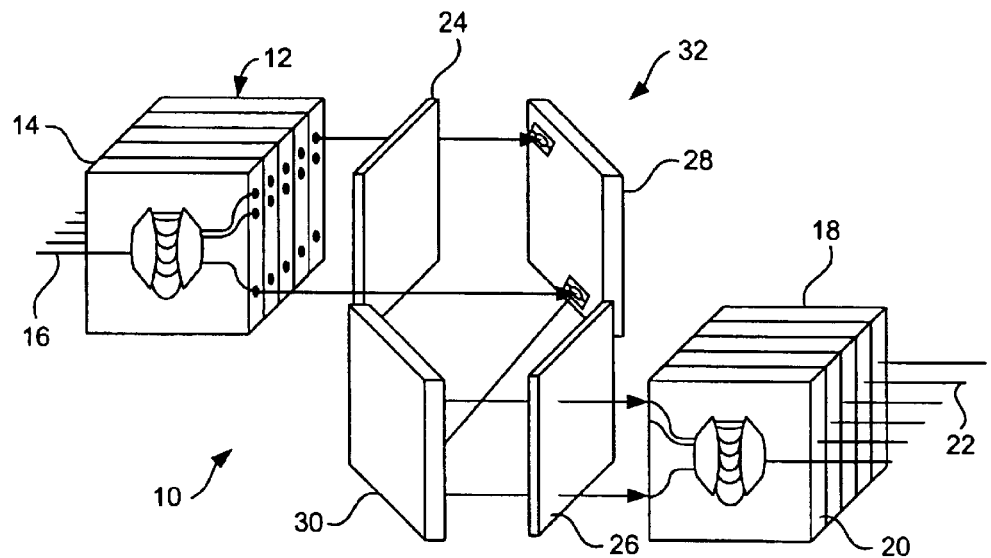
FIG. 1 is a diagram of the optical switch according to one embodiment of the present invention.

Referring to FIG. 1, a diagram of the optical switch according to one embodiment of the present invention is shown. The optical switch 10 includes a first stack 12 of substrates 14 each coupled to input fibers 16, a second stack 18 of substrates 20 each coupled to output fibers 22, an input lens array 24, an output lens array 26, a moveable input mirror array 28, and a moveable output mirror array 30. Together, the moveable input mirror arrays 28 and 30 form a switching matrix 32. The input fibers 16 and the output fibers 22 are each capable of simultaneously transmitting multiple wavelength (or lambda) signals. During operation, the substrates 14 receive lambda signals from the input fibers 16 respectively. Each of the substrates 14 demultiplex the lambda signals to provide a two dimensional array of wavelength dependent outputs. The input lens array 24 produces collimated free-space output beams from the wavelength dependent output signals. The switching matrix 32 switches the collimated beams through the output lens array 26 to the second stack 18. The substrates 20 then multiplex the lambda signals and provide them to the output fibers 22 respectively.

In the embodiment shown in FIG. 1, the substrates 14 of stack 12 and the substrates 20 of stack 18 are arranged in a vertical configuration. With this configuration, each of the substrates 14 separates the lambda signals ($\lambda$) of like wavelengths into horizontal planes. Similarly the substrates 20 of the output stack 18 are configured to receive like wavelength inputs in horizontal planes. Table I below illustrates the wavelength dependent horizontal planes for a switch 10 receiving M fibers with N channels per fiber.

TABLE I

| $\lambda_1^{(1)}$ | $\lambda_1^{(2)}$ | ... | $\lambda_1^{(M)}$ |
| $\lambda_2^{(1)}$ | $\lambda_2^{(2)}$ | | $\lambda_2^{(M)}$ |
| . | | | |
| . | | | |
| $\lambda_N^{(1)}$ | $\lambda_N^{(2)}$ | | $\lambda_N^{(M)}$ |

In an alternative embodiment, the substrates 14 and substrates 20 can be arranged in a horizontal configuration. With this configuration, each of the substrates 14 separates the lambda signals of like wavelengths into vertical planes and the substrates 20 are configured to receive like wavelength signals in the same vertical planes. Table II below illustrates the wavelength dependent vertical planes for a switch 10 receiving M fibers with N channels per fiber. The vertical or the horizontal configuration of the substrates can be chosen depending on the number of fibers M and channels N in order to optimize some parameters such as the angle needed to make a connection between the input and output mirrors.

TABLE II

| $\lambda_1^{(1)}$ | $\lambda_2^{(1)}$ | ... | $\lambda_N^{(1)}$ |
| $\lambda_1^{(2)}$ | $\lambda_2^{(2)}$ | | $\lambda_N^{(2)}$ |
| . | | | |
| . | | | |
| $\lambda_1^{(M)}$ | $\lambda_N^{(2)}$ | | $\lambda_N^{(M)}$ |

In one embodiment, the moveable input mirror array 28 and the moveable output mirror array 30 forming switching matrix 32 are each planer two-dimensional MEMS mirror arrays formed on a substrate with tilt-able mirrors that scan in one axis. As the wavelength dependent optical signals are to be switched only in like wavelength planes, only one tilt axis is necessary. The number of mirrors on each array 28 and 30 equals the number of row and column outputs and inputs defined by the substrates 14 and 20 respectively.

In an alternative embodiment, the mirrors can also be configured to scan in a second axis for alignment purposes. For example, the mirrors can be selectively tilted or rotated along the second axis to correct for any misalignment between the input and output mirror arrays. The mirrors can also be purposely misaligned or not placed in their optimal position to equalize the power levels of the wavelength dependent output signals to the lowest power level among the output signals within one output fiber or in all output fibers. As such, signal attenuation is used to obtain channel equalization and to compensate for any non-uniformity.

As is known in the art, voltages are used to control the tilt of the mirrors in either one or two axis using electrostatic attraction. Torsion bars are used to restore the position of the mirrors. In yet other alternative embodiments, electromagnetic forces may be used to move the mirrors. In yet other alternative embodiments, any other type of switching fabric available now or in the future may be used in place of MEMS mirror arrays within the switch 10. For example, any opto-mechanical, electro-optical, thermo-optic device capable of switching spatially optical beams can be used.

Figure 2:
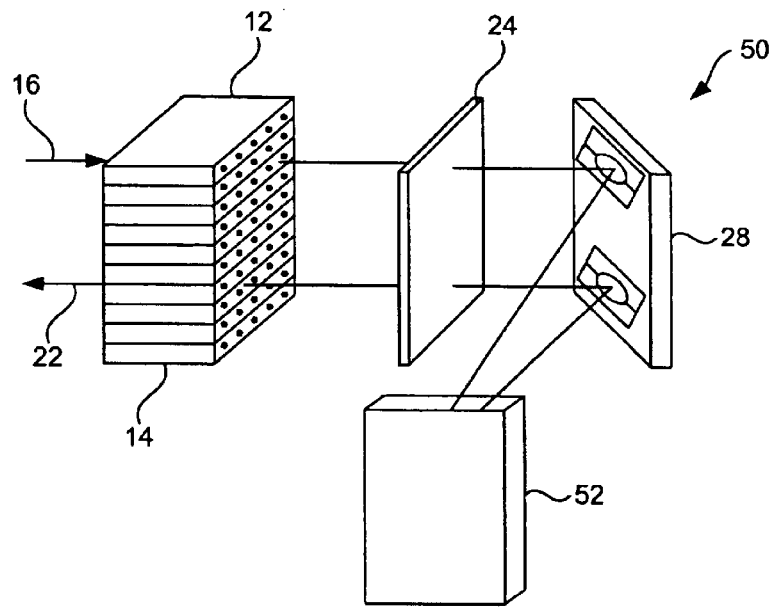
FIG. 2 is a diagram of the optical switch of the present invention according to yet another embodiment of the invention.

Referring to FIG. 2, a diagram of an optical switch 50 according to another embodiment of the invention is shown. In this embodiment, a fixed mirror 52 is used in place of the stack 18 of substrates 20, output lens array 26, and moveable output mirror array 30. During operation, the fixed mirror 52 receives and reflects lambda signals from and to the movable input mirror array 28 so that any lambda signal received on an input fiber 16 can be switched to an output fiber 22. With this type of switch, the input and output fibers are on the same side and plane of the switch and a fiber can be used either as an input or an output at any point in time. In alternative variations of this embodiment, the tilt-able mirrors of the input mirror array 28 can scan in either one or two axis for the same reasons described above.

Figure 3:
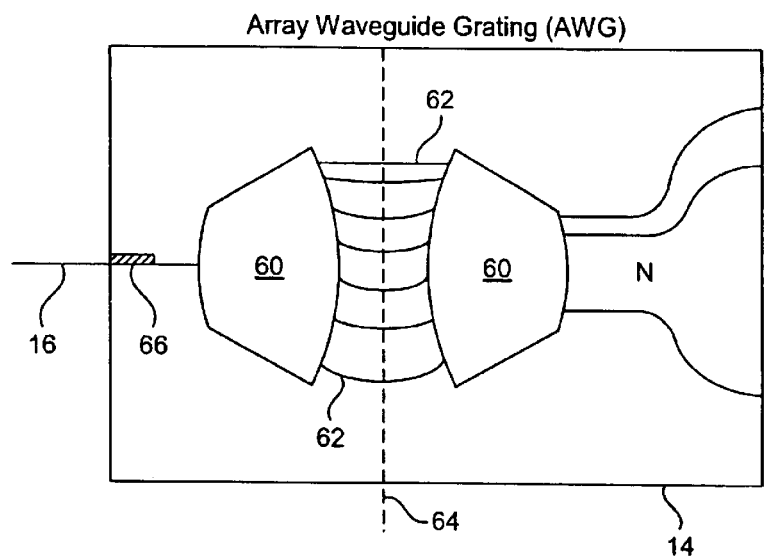
FIG. 3 is a diagram of the stackable substrates of the optical switch according to one embodiment of the present invention.

Referring to FIG. 3, a diagram of a substrate 14 according to one embodiment of the invention is shown. In this embodiment, the substrate 14 is an Array Waveguide Grating (AWG) formed on or buried in a planar monolithic substrate of silicon or silica. The AWG includes a plurality of unequal path length waveguides 62 interconnected by a pair of star couplers 60 to form an optical diffraction grating or interferometer. The waveguide paths 62 can be either regularly or non-regularly spaced on the substrate. In one embodiment, the coupling efficiency between the input fiber 16 to the star coupler 60 is improved by tapering the end of the star-coupler input waveguide 66 to the fiber 16. The AWGs integrated with the switch matrix provide enhanced performance such as lower signal attenuation because the demultiplexing function is performed within the optical switch 10. Compared to the case where the AWGs used as demultiplexers are interconnected to the switching matrix with fibers, the coupling between a fiber and a star coupler waveguide happens only once on the input side and not a second time on the output side. Rather on the output side, the optical beams out of the star coupler are directly collimated by the input lens array 24 and not coupled to any fiber. The ends of the waveguides 64 can be tapered to obtain beams of specific Mode Field Diameter (MFD) and Numerical Aperture (NA) to be collimated by the lens array 24. The spacing between the waveguides 64 can be adjusted to match the mirror spacing of the input mirror array 24. Similarly, the AWG of FIG. 4 can be used in the opposite direction for the substrates 20 of output stack 18. With this arrangement, the AWGs are used to multiplex the N lambda signals received from the switching matrix 32 to an output fiber 22. For a more detailed discussion on one type of AWG that could be used in the present invention, see U.S. Pat. Nos. 5,002,350, 5,904,042 and No. 5,136,671, all incorporated by reference herein for all purposes. In various other embodiments of the invention, other devices besides AWGs can be used. For example, the lambda signals can be demultiplexed and multiplexed using interferometers or wavelength dependent optical indexes implemented on or in monolithic substrates.

In one embodiment of the invention, a pair of sixty-four stacked AWG substrates, each for sixty-four wavelengths is used for the input stack 12 and output stack 18 respectively. With this configuration, up to 4096 lambda signals can be simultaneously switched from sixty-four input fibers to sixty-four output fibers. It should be noted, however, that this example should in no way limit the scope of the present invention. In alternative embodiments of the invention for example, the number of AWGs and the number of wavelengths per AWG can vary to create switches capable of switching either more or fewer lambda signals.

The stacking of substrates 14 and 20 to form stacks 12 and 18 may create several problems if not done properly. If the substrates 14 are not stacked in proper alignment, the two-dimensional array of output beams from the stack 12 may not be in parallel with one another. Any error ($\Delta X$) in the position of a beam will induce an error ($\Delta \theta \approx \Delta X/f$ where $\Delta X$ is small relative to f) in the direction of the beam to the mirror array 28 where (f) is the focal length of the lenses of the array 24. Similarly, if the inputs to the stack 18 are not in alignment, it may result in the attenuation of signals received from the switching matrix 32. The ability to monitor the power of the optical signals out of the switching matrix is useful in optimizing the position of the mirrors in order to set connection with minimum signal attenuation. The ability to monitor the power of the optical signals into and out of the switching matrix 32 is also desirable to measure signal attenuation through the switch 10. For example, by monitoring the power of the optical signals out of the switching matrix, the individual mirrors of the MEMS can be adjusted to equalize the power levels of the signals as described above. To address these issues, plates to align the substrates of the stacks and to monitor the power of the optical signals can be used in various embodiments of the present invention.

Referring to FIG. 4, a diagram of an alignment plate for aligning the substrates 14 of stack 12 is shown. The alignment plate 70 includes a two-dimensional array of detectors 72 arranged at predetermined locations on the plate. The alignment plate also includes a two-dimensional array of recess regions 74 positioned at known locations with respect to the detectors 72. The substrates 14, for example AWGs, are modified to include waveguide taps 76 for each lambda output. The taps 76 provide a portion of a lambda signal to a known location at the output of the substrates with respect to the beam outputs. During assembly, the substrates 14 are coupled to the input fibers respectively. The first substrate is then positioned in front of the alignment plate 70 to the location where the power measured by the detectors is at a maximum when multi-channel optical signals are transmitted through the input fibers 16. At this point, the demultiplexed beams from the outputs of the substrates 14 are concentric with the recess regions 74. All the substrates 14 are aligned to the alignment plate 70 using the same method, one after another or in parallel. Once alignment is achieved, the entire assembly including the substrates 14 and the alignment plate 70 are adhered together using an adhesive.

Referring to FIG. 5, a diagram of an alignment plate for aligning output AWG substrates 20 according to one embodiment of the present invention is shown. In this embodiment, the AWGs are in a different configuration. Each AWG has one star coupler 60a with two waveguides 66 and 67, and another star coupler 60b with two sets of N waveguides 64 and 65 with N the number lambda signals. The interferometer is designed so the AWG can multiplex the N lambda signals from the N waveguides 64 to the waveguide 65 and to demultiplex the N lambda signals from the waveguide 67 to the N waveguides 65. With this embodiment the lambda signals received by the waveguides 64 from the switching matrix 32 are multiplexed onto the output fiber 22. Taps 80 are used to feedback the multiplexed lambda signals from each output fiber 22 back to the stack 18. The tapped lambda signals from fiber 80 are then demultiplexed to the waveguides 65. Using a similar alignment and assembly process as described above, the stack of substrates 20 are aligned to the alignment plate 70. The substrates are positioned in front of the alignment plate 70 to the location where the power measured by the detectors is at a maximum when multi-channel optical signals are transmitted through the input fibers 80.

Referring to FIG. 6, a diagram of an alignment plate 70 for aligning the output substrates 20 of stack 18 according to another embodiment is shown. In this embodiment, each channel 91 on a substrate 20 has a tap 90 including a pair of mirrors 92a and 92b which reflect a portion of the lambda signal received at the substrate 20 back to the input of the substrate. FIG. 7B shows an exploded view of this arrangement. The substrates 20 are aligned and adhered together with the alignment plate 70 in a manner similar to that described above. The substrates are positioned in front of the alignment plate 70 to the location where the power measured by the detectors is at a maximum when different channel optical signals are transmitted through the tap waveguides 90.

Figure 7:
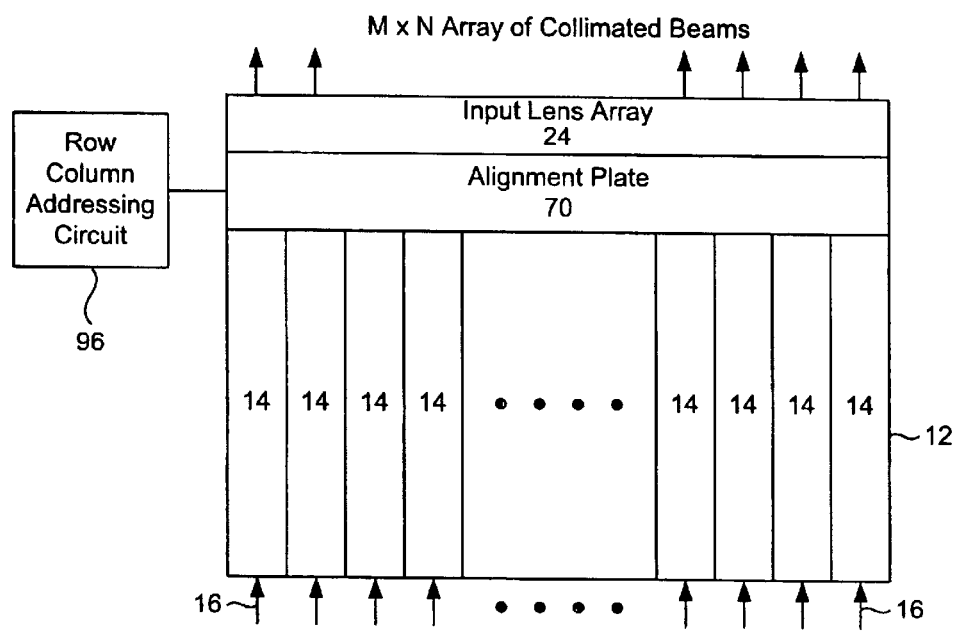
FIG. 7 is a top down perspective view of the alignment plate secured to a plurality of substrates of a stack according to the present invention.

FIG. 7 is a top down perspective view of the alignment plate 70 secured to a plurality of substrates 14 of a stack 12 according to the present invention. The input lens array 24 may optionally be either adhered to the alignment plate 70 as shown so that it to is aligned with the stack 12 or can be integrated (not shown) onto either side of the alignment plate 70. With this arrangement, an M-by-N array of collimated beams is provided at the output of the structure. Finally, for large switching systems, a relatively large number of detectors 72 may be needed on the alignment plate 70. To reduce complexity, a row-column addressing circuit 96 may be used to address the detectors 72 to reduce the number of electrical connections to the alignment plate 70.

Although not illustrated, an alignment plate 70 used with substrates 20 of an output stack 18 with output lens array 26 would have the complement configuration of that described above.

In various other embodiments of the invention, the detectors 72 are photodiodes having a size approximately the same as the beams for better sensitivity during alignment. The alignment plate 70 may also not include recess regions 74 depending on the wavelengths of the lambda signals. For example, a silicon alignment plate 70 without recess regions 74 may be used with lambda signals in the 1310 and 1550 nanometer ranges since silicon is transparent to signals at these wavelengths.

Figure 8:
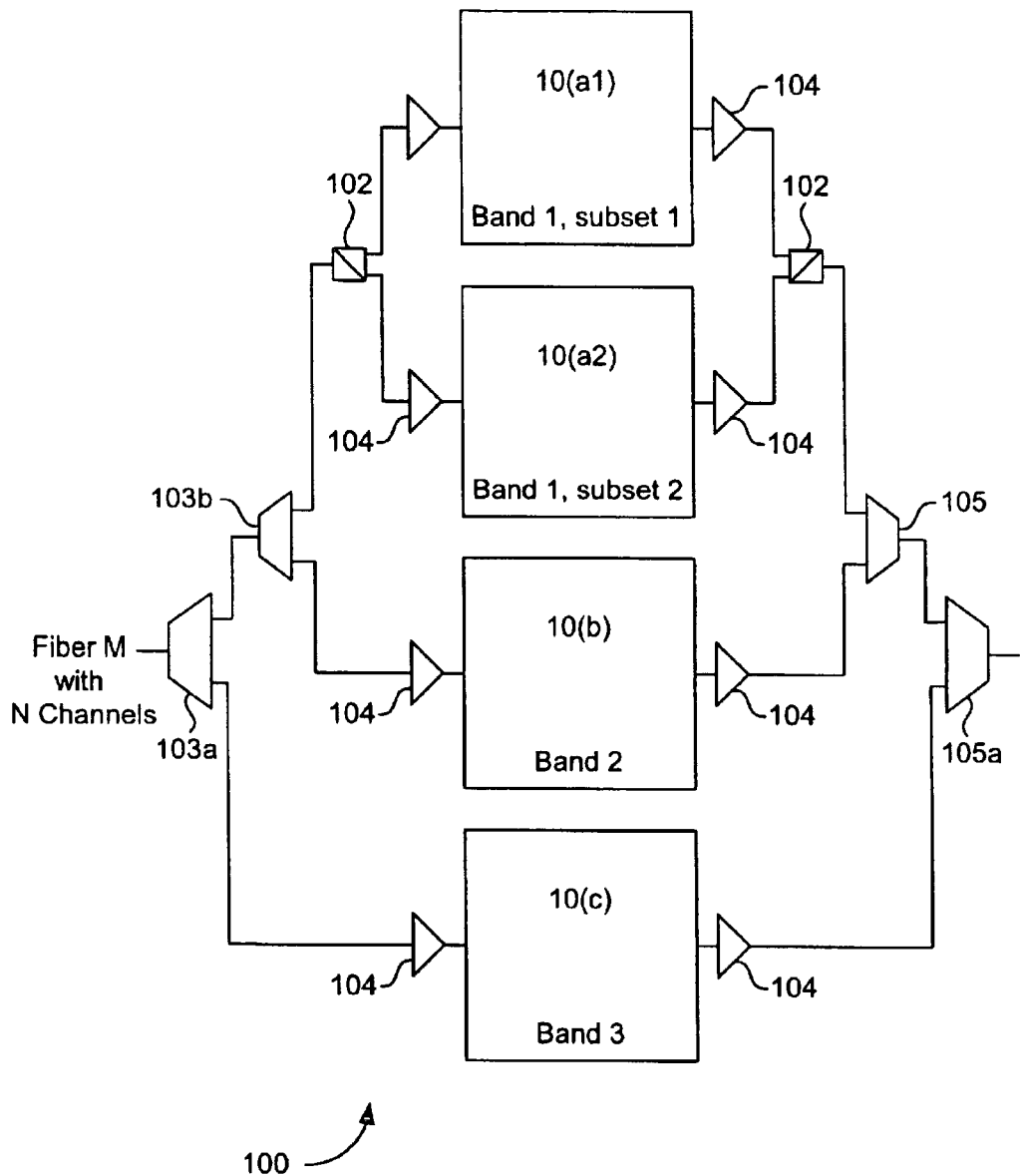
FIG. 8 is a diagram of a scalable wavelength selective cross-connect using the optical switch of the present invention.

FIG. 8 is a diagram of a scalable wavelength selective cross-connect using a plurality of the optical switches 10 of the present invention. The cross-connect 100 is configured to receive M fibers, each having N channels. However for the sake of clarity, only one input and one output fiber is shown. The cross-connect 100 includes a plurality of switches 10 each dedicated to switch lambda signals or channels within a selected band of low loss transmission in a fiber or amplification. For example, lambda signals of different wavelengths from input fibers M can be demultiplexed by demultiplexer 103a into a first band around 1310 nm, and a second band of around 1550 nm. The band around 1550 nm can be further demultiplexed by a demultiplexer 103b into two sub-bands C and L bands that correspond to two different standard bands of amplification. Finally, interleavers 102 or optical filters are used, in this embodiment, to separate the channels of a band such as the C band into two sets of interleaved channels. In alternative embodiments, additional interleavers 102 can be used to further divide a band into additional subsets. In this example, switch 10(a1) is configured to switch the first subset of signals in the C band, switch 10(a2) is configured to switch the second subset, switch 10(c) is configured to switch the L band, and switch 10(d) is configured to switch the band around 1310 nm. Once the lambda signals are switched within their respective bands, multiplexers 105a and 105b multiplexes the signals onto the output fiber. Of course as more bands are needed or are used, more switches 10 can be employed to increase the switching capacity of the cross-connect 100. In yet another alternative embodiment, the switches 50 can be used in cross-connect 100.

In situations where signal attenuation or loss is a problem, optical amplifiers may be provided in one or more locations within the cross-connect 100. In various embodiments of the invention, optical amplifiers 104 can be provided along the input fibers and/or the output fibers. The amplifiers can be any type of optical amplifier including but not limited to rare-earth doped fiber amplifiers or rare-earth doped waveguide amplifiers. The amplifiers can also be embedded into the substrates 14 and/or 20. For example, in the case where the substrates are monolithic substrates of glass, an amplifying waveguide section for the C band can be made out of a Er—Yb doped region using ion-exchange technology. See "Integrated Optics Er—Yb Amplifier with Potassium Ion-Exchanged Glass Waveguides", by Meshkinfam et al, Photonics Research Group, Ecole Polytechnique, Montreal, Quebec, Canada and McGill University, Montreal, Quebec, 1996, incorporated by reference herein for all purposes. This paper describes how to make waveguide amplifiers to realized a gain region in glass substrates. Furthermore, signal attenuation in the switches 10 can be used, by misaligning the mirrors from their optimum position as described above, to obtain channel equalization to compensate for wavelength-dependent gain in the amplifiers.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. An apparatus comprising:
    a plurality of input fibers, each of the plurality of input fibers configured to carry a plurality of lambda signals;
    a first stack of substrates, each of the substrates coupled to one of the input fibers and configured to demultiplex the lambda signals carried on the input fiber by wavelength respectively;
    an alignment plate mounted onto the firsts stack of substrates, the alignment plate configured to align the demultiplexed lambda signals into parallel collated beams;
    a plurality of output fibers; and
    an optical switching matrix configured to switch the demultiplexed lambda signals in the optical domain from the first stack of substrates to the plurality of output fibers without the need to convert the lambda signals to the electrical domain.

2. The apparatus of claim 1, further comprising a second stack of substrates coupled between the switching matrix and the output fibers, each of the substrates of the second stack configured to multiplex the switched lambda signals onto one of the output fibers respectively.

3. The apparatus of claim 1, wherein the switching matrix is wavelength dependent so that each of the plurality of lambda signals can be switched only between same wavelength channels on the input fibers and the output fibers respectively.

4. The apparatus of claim 3, wherein the switching matrix comprises a MEMS array of mirrors wherein the mirror tilt along a first axis.

5. The apparatus of claim 4, wherein the switching matrix comprises a MEMS array of mirrors wherein the mirrors tilt along a second axis to compensate for misalignment.

6. The apparatus of claim 1, wherein the switch matrix comprises a MEMS array of mirrors configured to selectively tilt in one or two axis so as to equalize the power of the demultiplexed lambda signals from the first stack of substrates.

7. The apparatus of claim 1, wherein the switching matrix comprises a MEMS array of tilt-able mirrors formed voltages are used to control the tilt of the mirrors using electrostatic attraction.

8. The apparatus of claim 1, wherein each of the substrates of the first stack is a monolithic substrate.

9. The apparatus of claim 1, wherein each of the substrates of the first stack comprise waveguide paths of unequal lengths.

10. The apparatus of claim 9, wherein the waveguide paths of unequal lengths are interconnected with star couplers.

11. The apparatus of claim 10, wherein the waveguide paths and the star couplers form a substantially symmetrical optical diffraction grating.

12. The apparatus of claim 1, wherein the each of the substrates of the first stack demultiplex the lambda signals by wavelength using a wavelength dependent optical index.

13. The apparatus of claim 1, wherein each of the substrates of the first stack demultiplex the lambda signals using interferometry.

14. The apparatus of claim 1, further comprising a lens array positioned between the first stack of substrates and the switching matrix, the lens array configured to generate a plurality of collimated optical beams from the demultiplexed lambda signals.

15. The apparatus of claim 14, wherein the lens array is formed on a monolithic substrate.

16. The apparatus of claim 1, further comprising a lens array mounted onto the alignment plate.

17. The apparatus of claim 1, wherein the alignment plate further comprises a plurality of detectors, the detectors configured to measure the power of the demultiplexed lambda signals tapped from the plurality of substrates of the first stack respectively.

18. The apparatus of claim 17, wherein the alignment plate further comprises a plurality of regions arranged at a predetermined distance with respect to the plurality of detectors, the regions further configured to be concentric with the demultiplexed lambda signals when the substrates of the first stack and the alignment plate are in alignment.

19. The apparatus of claim 17, wherein the plurality of detectors are photodiodes.

20. The apparatus of claim 16, wherein the lens array is integrated into the alignment plate.

21. The apparatus of claim 2, further comprising an alignment plate mounted onto the second stack of substrates, the alignment plate configured to provide aligned beams of switched lambda signals from the switching matrix to the inputs of the substrates of the second stack.

22. The apparatus of claim 2, wherein the second stack of substrates is arranged to multiplex switched lambda signals onto the output fibers and to demultiplex the lambda signals fed back through taps from the output fibers to the second stack of substrates respectively so that an alignment plate can be aligned with the second stack of substrates.

23. The apparatus of claim 21, wherein the alignment plate further comprises a plurality of detectors, the detectors configured to measure the power of the multiplexed lambda signals taped and fed back from the plurality of substrates of the second stack respectively.

24. The apparatus of claim 23, wherein the alignment plate further comprises a plurality of regions arranged at a predetermined distance with respect to the plurality of detectors, the regions further configured to be concentric with the aligned beams of switched lambda signals when the plurality of second substrates in the stack and the alignment plate are in alignment.

25. The apparatus of claim 24, wherein the plurality of detectors are photodiodes.

26. The apparatus of claim 1, further comprising a fixed mirror configured to receive lambda signals from the switching matrix and to reflect them back to the switching matrix.

27. The apparatus of claim 1, wherein the substrates of the first stack are configured to demultiplex lambda signals in different bands of amplification.

28. The apparatus of claim 27, wherein the different bands of operation include at least one of the following bands: band around 1310 nm, C and L bands around 1550 nm.

29. The apparatus of claim 27, further comprising an interleaver configured to separate the lambda signals in a selected band of amplification into subsets of interleaved lambda signals.

30. The apparatus of claim 27, further comprising amplifiers to amplify the lambda signals in the different bands of amplification.

31. The apparatus of claim 30, wherein the amplifiers are rare-earth doped fiber amplifiers.

32. The apparatus of claim 30, wherein the amplifier are rare-earth doped waveguide amplifiers.

33. The apparatus of claim 30, wherein the amplifiers are integrated into the substrates.

34. The apparatus of claim 30, wherein the amplifiers are located on the input fibers.

35. The apparatus of claim 30, wherein the amplifiers are located on the output fibers.

36. A method of providing an optical switch comprising:
providing a plurality of input fibers, each of the plurality of input fibers configured to carry a plurality of lambda signals;
providing a first stack of substrates, each of the substrates coupled to one of the input fibers and configured to demultiplex the lambda signals carried on the input fiber by wavelength respectively;
providing a first stack alignment plate to align the first stack of substrates;
providing a plurality of output fibers; and
providing an optical switching matrix configured to switch the demultiplexed lambda signals in the optical domain from the first stack of substrates to the plurality of output fibers without the need to convert the lambda signals to the electrical domain.

37. The method of claim 36, further comprising providing a second stack of substrates coupled between the switching matrix and the output fibers, each the subsides of the second stack configured to multiplex the switched lambda signals onto one of the output fibers respectively.

38. The method of claim 36, wherein the provided switching fabric is a MEMS array of tilt-able mirrors wherein the mirrors scan primarily along one axis.

39. The method of claim 36, wherein the provided switching fabric is a MEMS array of tilt-able mirrors wherein the mirrors selectively scan along one or two axis so the EMS away is capable of equalizing the power of the demultiplexed lambda signals from the first stack of substrates during operation.

40. The method of claim 36, wherein each of the provided substrates of the first stack are array waveguide gratings.

41. The method of claim 36, further comprising providing a fixed mirror configured to receive lambda signals from the switching matrix and to reflect the lambda signals back to the switching matrix.

42. The method of claim 36, further comprising providing a plurality of the optical switches to form a scalable cross-connect.

43. The method of claim 37, further comprising providing a second alignment plate to align the second stack of substrates.

44. A method for assembly of an optical switch, comprising:
stacking a first plurality of substrates into a first stack, each of the first plurality of substrates in the first stack capable of receiving input lambda signals and providing demultiplexed output signals;
aligning the first plurality of substrates in the first stack by positioning each of the first plurality of substrates to a position where a plurality of detectors on an alignment plate measure the maximum signal power of the demultiplexed output lambda signals from each of the first plurality of substrates respectively; and
adhering the first plurality of substrates and the alignment plate together when alignment of the first plurality of substrates of the first stack is achieved.

45. The method of 44, further comprising:
stacking a second plurality of substrates into a second stack, each of the second plurality of substrates in the second stack capable of receiving switched lambda signals and providing multiplexed output lambda signals;
aligning the second plurality of substrates in the second stack by positioning each of the second plurality of substrates to a position where a second plurality of detectors on a second alignment plate measure the maximum signal power of the multiplexed output signals lambda from each of the second plurality of substrates respectively; and
adhering the second plurality of substrates and the second alignment plate together when alignment of the second plurality of substrates of the second stack is achieved.

46. The method of claim 44, wherein the alignment of the first plurality of substrates is performed one substrate at a time.

47. The method of claim 44, wherein the plurality of detectors on the alignment plate measure the maximum signal power from the demultiplexed output lambda signals from taps configured on the first plurality of substrates respectively.

48. The method of claim 46, wherein the alignment of the first plurality of substrates is performed in parallel.

49. The method of claim 45, wherein the second plurality of detectors on the second alignment plate measure the maximum signal power from the multiplexed output lambda signals from taps configured on the second plurality of substrates respectively.

50. A cross-connect, comprising:
a plurality of optical switches, each of the optical switches configured to receive a plurality of input fibers each configured to carry a plurality of lambda signals within a selected band of amplification respectively, each of the optical switches further comprising:
a first stack of substrates, each of the substrates coupled to one of the input fibers and configured to demultiplex the lambda signals carried on the one input fiber by wavelength respectively;
an alignment plate to align the first stack of substrates;
a plurality of output fibers; and
an optical switching matrix configured to switch the demultiplexed lambda signals in the optical domain from the first of substrates to the plurality of output fibers without the need to convert the lambda signals to the electrical domain.

51. The cross-connect of claim 50, wherein each of the optical switches further comprising a second stack of substrates coupled between the switching matrix and the output fibers, each of the substrates of the second stack configured to multiplex the switched lambda signals onto one of the output fibers respectively.

52. The cross-connect of claim 50, wherein the selected band of amplification includes one of the following bands of amplification: 1310 nanometers, 1550 nanometers; C band or L band.

53. The cross connect of claim 50, wherein at least one of the optical switches further comprises an interleaver to divide the selected band of amplification of the one optical switch into sub-bands of amplification.

54. The cross-connect of claim 50, further comprising amplifiers to amplify the lambda signals in the different bands of amplification.

55. The cross connect of claim 51, wherein an alignment plate is used to align the second stack of substrates.

56. The cross-connect of claim 54, wherein the amplifiers are rare-earth doped fiber amplifiers.

57. The cross-connect of claim 54, wherein the amplifiers are rare-earth doped waveguide amplifiers.

58. The cross-connect of claim 54, wherein the amplifiers are integrated into the substrates.

59. The cross-connect of claim 54, wherein the amplifiers are located along the input fibers.

60. The cross-connect of claim 54, wherein the amplifiers are located along the output fibers.

61. An apparatus, comprising:
a plurality of input fibers, each of the input fibers configured to carry a plurality of lambda signals;
a first stack of substrates, each of the substrates coupled to one of the input fibers and configured to demultiplex the lambda signals carried on the input fiber by wavelength respectively using waveguide paths of unequal length;
an array of lenses configured to produce a first set of collimated optical beams from the demultiplexed lambda signal,
a switching matrix including a first MEMs array and a second MEMs configured to switch the spatial position of the first set of collimated optical beams to produce a second set of collimated optical beams;
an output lens array to produce converging optical beams from the second set of collimated optical beams;
a second stack of substrates configure to combine multiple optical beams of different lambdas onto a plurality of output fibers from the converging optical beams from the second set of collimated optical beams; and
an element configured to equalize the power of the demultiplexed lambda signals at the output of the second stack of substrates.

* * * * *